Feb. 28, 1933.  L. J. CAMPBELL ET AL  1,899,668
PARACHUTE APPARATUS
Filed May 8, 1930   6 Sheets-Sheet 2
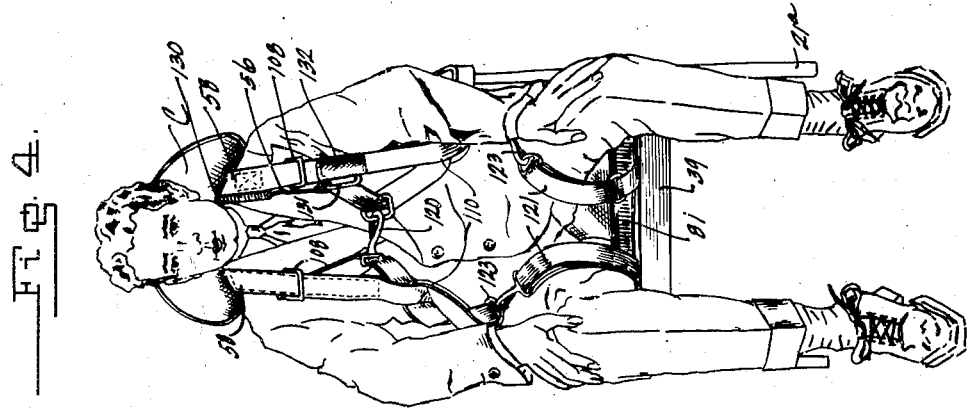
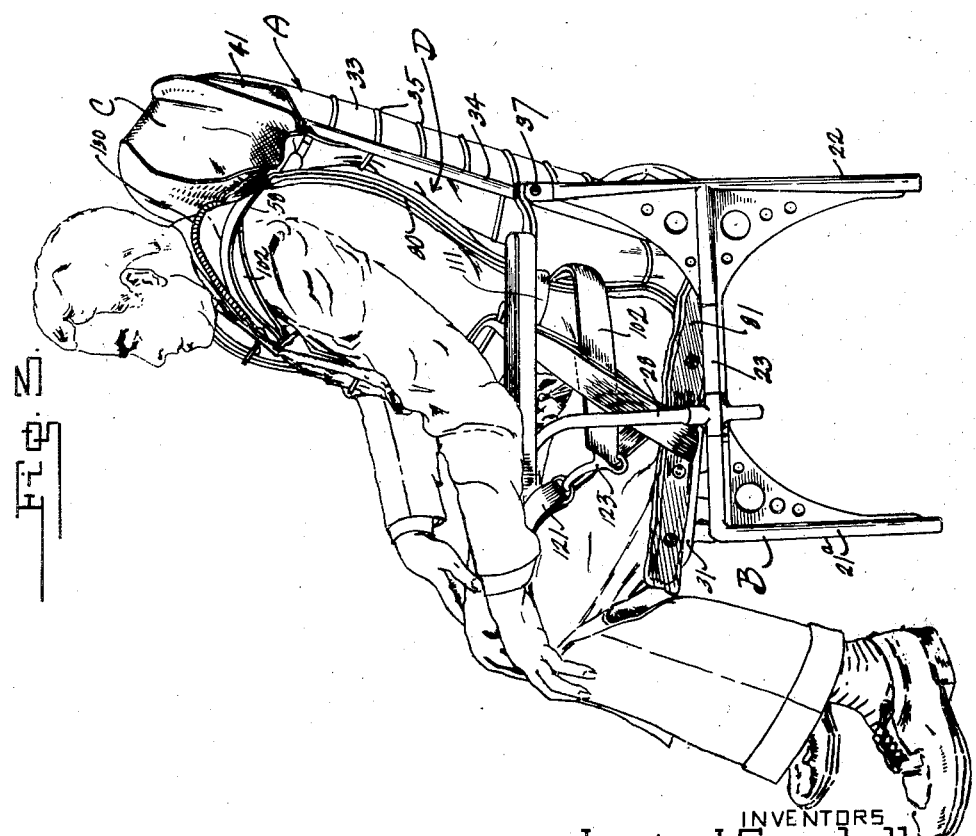
INVENTORS
Louis J. Campbell
Lyman H. Ford
Harold G. Rogers
BY Lancaster, Allwine & Rommel
ATTORNEYS.

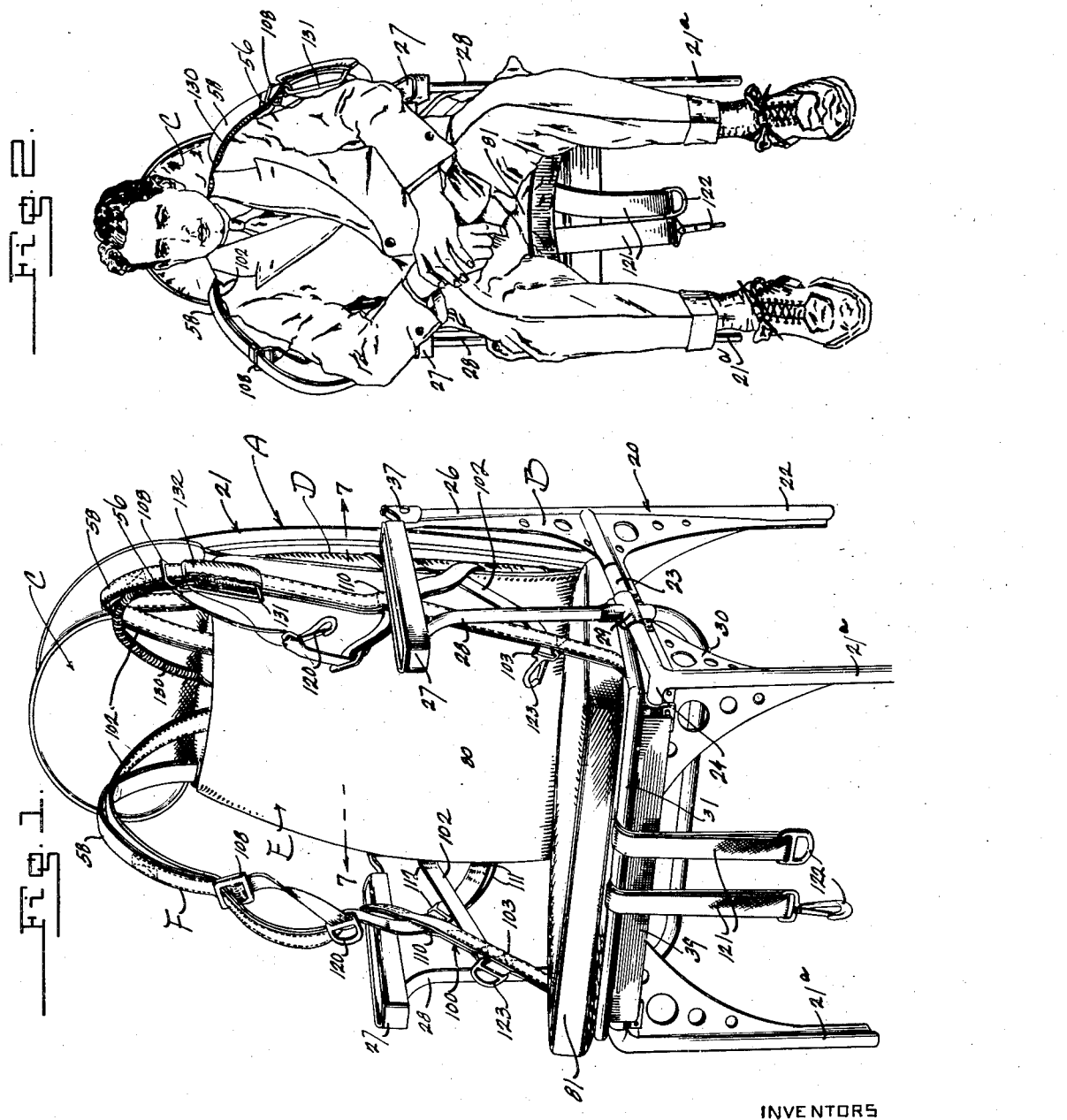

Feb. 28, 1933.   L. J. CAMPBELL ET AL   1,899,668
PARACHUTE APPARATUS
Filed May 8, 1930   6 Sheets-Sheet 3
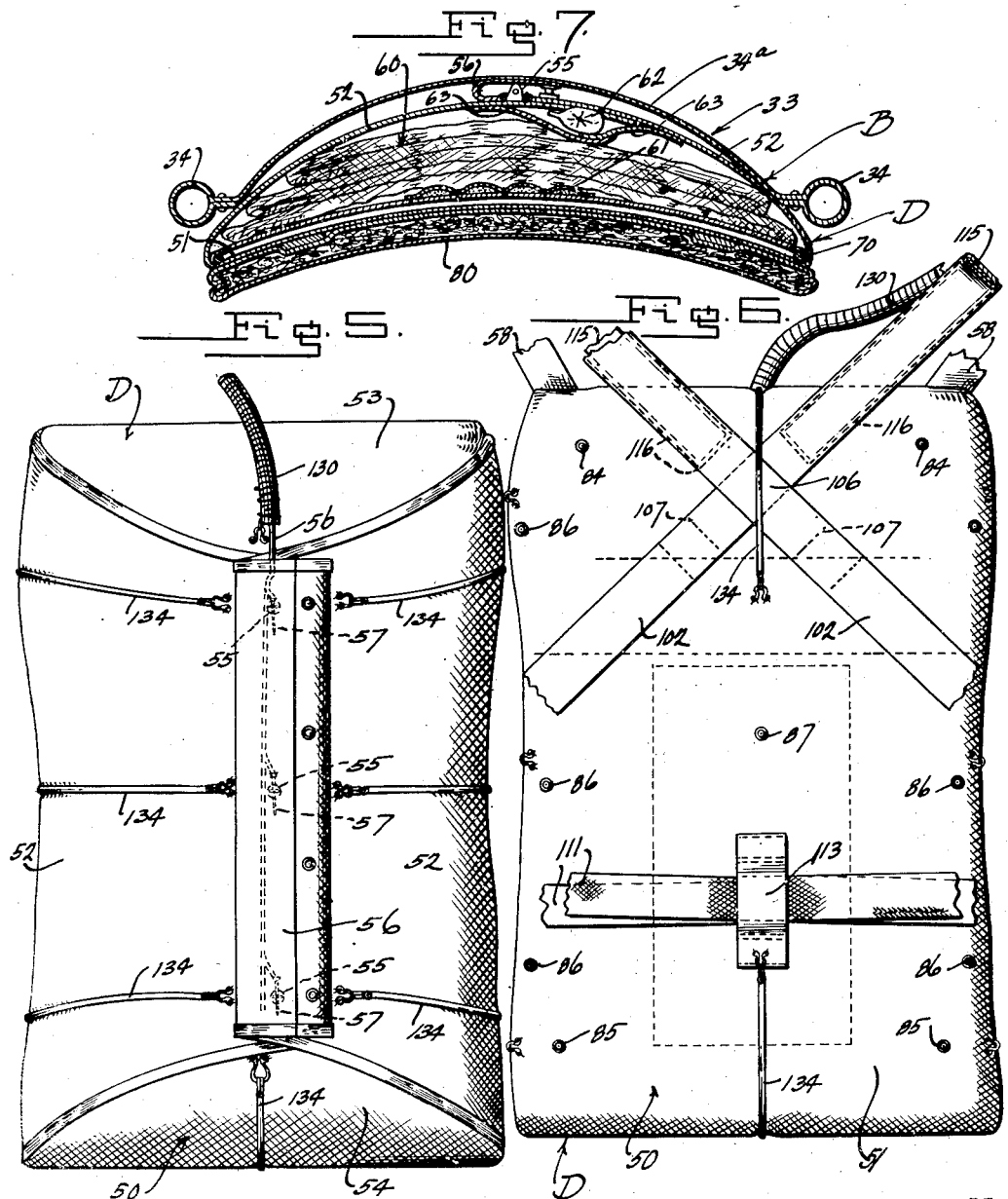
INVENTORS.
Louis J. Campbell
Lyman H. Ford
Harold G. Rogers
BY
ATTORNEYS.

Feb. 28, 1933. L. J. CAMPBELL ET AL 1,899,668
PARACHUTE APPARATUS
Filed May 8, 1930 6 Sheets-Sheet 4
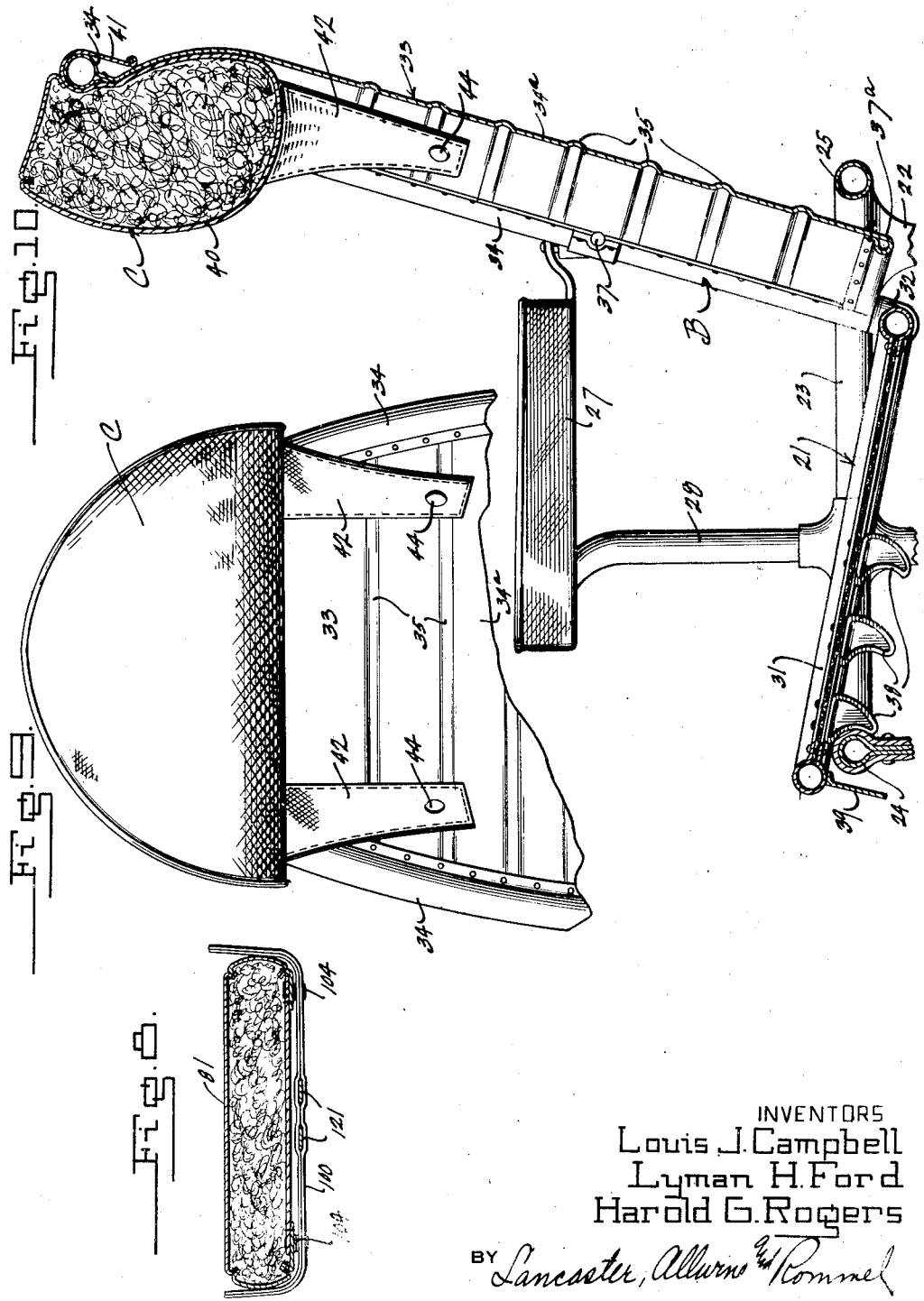
INVENTORS
Louis J. Campbell
Lyman H. Ford
Harold G. Rogers
BY Lancaster, Allwine & Rommel
ATTORNEYS.

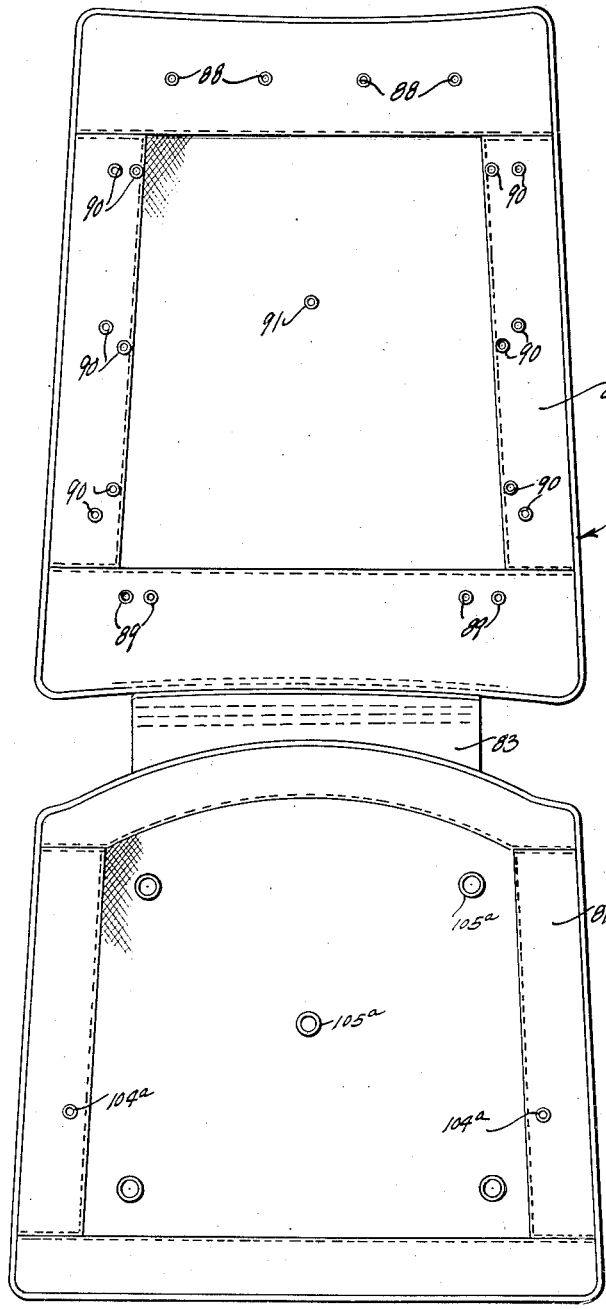
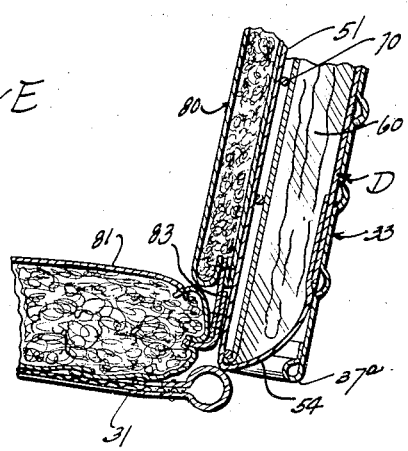
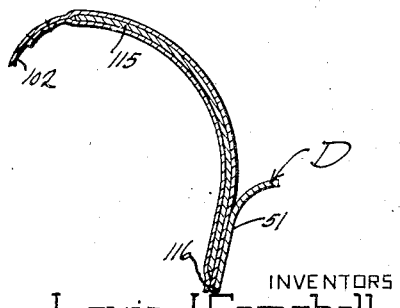

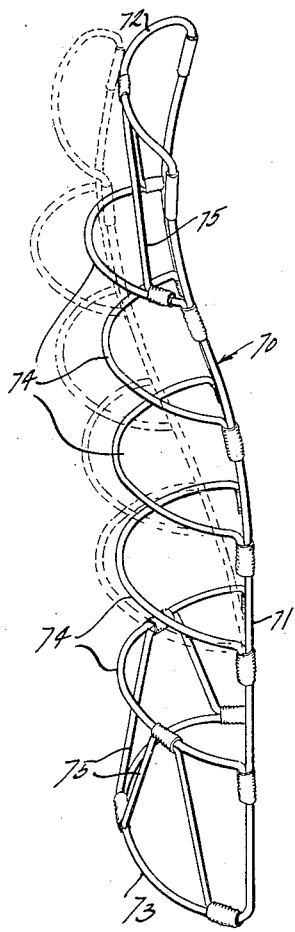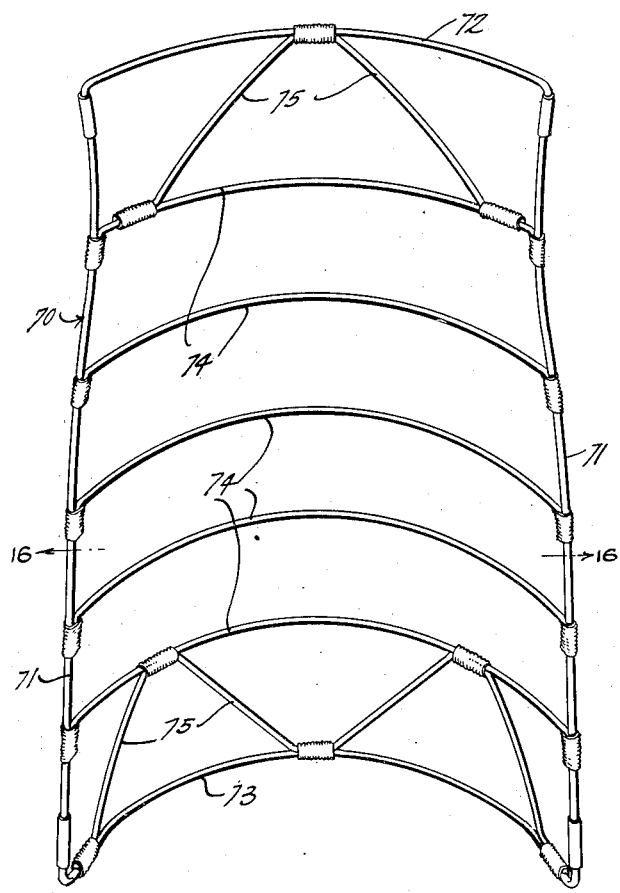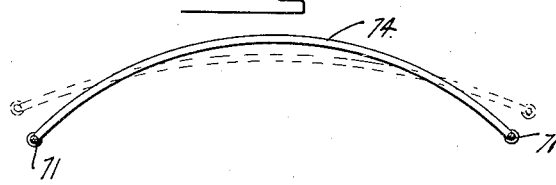

Patented Feb. 28, 1933

1,899,668

UNITED STATES PATENT OFFICE

LOUIS J. CAMPBELL, OF NEW YORK, AND LYMAN HANOVER FORD AND HAROLD GLENN ROGERS, OF BUFFALO, NEW YORK, ASSIGNORS TO IRVING AIR CHUTE COMPANY, INC., OF BUFFALO, NEW YORK, A CORPORATION

PARACHUTE APPARATUS

Application filed May 8, 1930. Serial No. 450,806.

This invention relates to improvements in parachute apparatus.

The primary object of this invention is the provision of a parachute chair device whereby in a passenger or aviator may be seated with comfort and safety; the parachute being inconspicuously associated with the chair and having a harness so arranged that when the emergency arises the aviator or passenger may instantly apply the harness to himself or herself, arise from the chair, and in so doing removing the parachute, free of the chair, and enabling the individual to jump or otherwise free himself or herself from the aircraft and thereafter pull the rip cord for freeing the parachute canopy.

Heretofore it has been deemed impractical to use parachutes in the enclosed or cabin type of aircraft. This has been true primarily because the cabin is not provided with sufficiently enlarged or a sufficient number of exits to enable the passengers to leave the aircraft; also because the doors of enclosed aircraft open outwardly, and because of wind pressure it would be practically impossible to open them and permit exit of occupants wearing parachutes. Furthermore, the present types of parachutes are not adaptable, either safely or with comfort, to be used by passengers and unskilled persons in cabin aircraft chairs. Many airplane manufacturers are at present engaged in solving the problem of permitting instant exit of passengers from cabin planes, and the present invention is an improvement upon the part of the parachute manufacturer to adapt the use of chair type parachutes to a general class of passengers and aviators with safety, comfort, and flexibility, and so that parachutes may be used in open or closed types of aircraft. With this end in view, we have provided an airplane parachute chair of an adjustable type, which may be adjusted by the passenger or aviator, to different inclined positions, and which is structurally provided with means for receiving a form-fitting pack in such manner that the pack is supported in a cooperative relation by the chair. With the pack is associated a harness which is supported in a position ready for immediate use should the emergency arise. This combination of details enables a passenger or aviator to be seated with comfort on long trips, and avoids the necessity of having the parachute pack continuously strapped to the individual. This is an important factor in flying schools, since students need not be fitted with parachutes prior to getting into the ship, and do not need to continually wear the parachute or harness during entering and leaving of the aircraft. This fact is of considerable psychological importance, because the passengers, aviators, and occupants need not be continually walking around with parachute equipment attached to them; the parachute equipment remaining inconspicuously with the chair and as a part thereof, but in position where it may be immediately applied to the sitter should necessity demand.

Other objects and advantages of this invention will be apparent during the course of the following detailed description.

In the accompanying drawings, forming a part of this specification, and wherein similar reference characters designate corresponding parts throughout the several views, Figure 1 is a perspective view showing the improved parachute chair with the harness in position. Note that the harness is out of the way to permit an individual to sit in the chair with comfort, yet it is in a position which will enable the sitter to instantly slip into the same.

Figure 2 is a front view showing how an individual rests in the chair during transport.

Figure 3 is a side perspective view showing the passenger with the harness applied and still resting in the chair proper.

Figure 4 is a front view of the passenger resting in the chair and with the harness applied.

Figure 5 is a view of the flap side of a preferred type of parachute pack employed with this invention.

Figure 6 is an opposite view of the parachute pack in a closed condition.

Figure 7 is a horizontal sectional view taken through the back of the chair showing the associated parachute pack details.

Figure 8 is a vertical sectional view taken through the seat upholstery of the chair, showing more particularly the harness sling of the parachute equipment which is associated therewith.

Figure 9 is a fragmentary front view of the upper part of the chair portion of the equipment, showing more particularly the head rest.

Figure 10 is a vertical sectional view taken through the chair proper of the improved equipment with the upholstery and parachute pack and harness removed.

Figure 11 is a view of the rear and under sides of the back and seat upholstery portions showing related details and their connection.

Figure 12 is a fragmentary vertical sectional view taken through the apparatus at the juncture of the seat and back.

Figure 13 is a sectional view taken through a part of the harness at its connection with the pack, showing the manner in which the harness is supported so as to enable the instant slipping of the arms of the passenger or aviator into the harness.

Figure 14 is a side perspective view of a shape retaining form-fitting frame used in the pack of the present invention, showing the flexible and form-fitting character of the same.

Figure 15 is a front view of the frame of Figure 14.

Figure 16 is a transverse sectional view through the frame of Figure 15, showing in full lines the normal position of the frame and in dotted lines the position to which the frame may flex in form-fitting relation to perform a function of expediting the opening of the pack container to permit exit of the parachute or parachutes immediately that the rip cord is pulled.

In the drawings, wherein for the purpose of illustration is shown only a preferred embodiment of the invention, the letter A may generally designate the improved parachute chair, which may include the chair proper B, having a head rest C detachably associated therewith. The chair proper B is constructed to receive a form-fitting pack D which is generally of the character set forth in a United States co-pending application, Serial No. 355,550. With the chair and parachute pack is associated an upholstery arrangement E, and with the chair and pack is associated harness F which is generally of the character set forth in U. S. Patent #1,560,366, but which embodies improvements thereover in the manner of adapting it to the pack and to the chair and person of the user.

The chair B is preferably of some light weight metal, such as aluminum, and possesses certain characteristics which are in general use. In the main the chair comprises a stationary frame 20 and the movable seat and back frame 21. The stationary frame 20 comprises front legs 21ª and rear legs 22. These legs are rigidly connected in a quadrangular arrangement by means of side horizontal bars 23, a front cross bar 24, and a rear cross bar 25. The bars 23, 24 and 25 of course define an opening wherein and whereabove the seat structure of the movable frame 21 operates, as will be subsequently described. The rear legs 22 extend vertically upright and continue at 26 above the connection of the side cross pieces 23. Suitable upholstered arm rests 27 extend horizontally forward from the upper ends of the uprights 26 and at their forward ends are supported by upright posts 28 which are connected at their lower ends at 29 to the horizontal cross pieces 23 intermediate the ends of the latter, as well shown in the drawings. Suitable reinforcing webs or gussets 30 connect the various legs, uprights and horizontal pieces of the stationary frame 20, as shown in the drawings, for reinforcing purposes.

Referring to the movable seat and back structure 21 of the chair, the same includes a tubular seat member 31 which is preferably formed of marginal tubing and a light weight metal seat body as shown in Figure 10 of the drawings. This seat member 31 is pivotally connected at 32 to the lower end of the chair back 33. The back 33 preferably comprises an inverted U-shaped tubular frame 34, the lower ends of which are connected at 32 in the pivotal manner shown in Figure 10, to the seat member 31. A light weight preferably rigid sheet metal back rest portion 34ª is riveted or otherwise secured in the U-shaped frame 34 and it is concavo-convex in cross section, providing a forwardly facing depression wherein the form-fitting parachute pack and upholstery back fits in a compact and snug-fitting relation, as will be apparent from the drawings. The back 34ª is very pronouncedly recessed, as can be gained from the cross sectional view in Figures 7 and 10, and it is transversely reinforced by corrugations 35. A lower tubular reinforcement 37ª may be provided by bending the material upon itself and securing at its ends to the lower ends of the inverted U-shaped tubular frame 34. The side portions of the U-shaped frame 34 of the back 33 are pivotally connected intermediate their ends upon suitable bearings 37 at the tops of the uprights 26 and in such position that the lower end of the back portion 33 of the movable part 21 lies forwardly of the rear cross bar 25 of the stationary part of the seat frame, as shown in Figure 10.

To permit adjustment of the chair and hold it in a desired position, a series of detents 38 are provided on the under sides of the side bars of the seat member 31 as shown in Figure 10, adapted to contact along the rear margin of the front cross piece 24 of the stationary frame part of the chair to limit the forward movement of the swinging portion 21 of the chair. A depending stop flange 39 along the front of the seat 31 of the swinging portion of the chair engages the front of the cross bar 24 to limit the rear movement of the swinging portion 21 of the chair, and to protect the clothing and body of the sitter. It is quite apparent that the seat 31 may be lifted upon its hinge 32 to adjust any of the detents or stops 38 against the cross bar 24 to incline the back rest 33 at various angles to suit the passenger or aviator. The essential improved feature of the chair is the fact that the movable back rest is countersunk to provide a deep forward facing depression for receiving the parachute pack in an inconspicuous relation.

An improved feature of the parachute chair is the provision of a detachable head rest C which is cooperative with the form-fitting parachute pack and upholstery in permitting the passenger or aviator to sit with comfort in the chair. This head rest C consists of a large padded body 40 rearwardly provided with an inverted marginal pocket 41 adapted to fit the upper frame of the swingable back rest 33. The pocket 41 is of course of flexible material and it marginally grips the tubing 34 of the back rest, as is quite apparent from Figure 10. To hold it in this position depending attaching straps 42 are provided, which fit over the front of the back rest body 34ª and are provided with suitable snap fastener parts 44 adapted to snap upon complementary parts provided on the body 34ª of the back rest in the positions shown in Figures 9 and 10 of the drawings. To release the head rest it is merely necessary to unfasten the snaps 44 and pull the head rest upwardly. It is noted that the straps 42 lie closely against the back rest body 34ª and the latter are covered by the parachute pack.

The back pack D is of the form-fitting type described in U. S. application for patent Serial No. 355,550, and is substantially the same as described in that co-pending application with the exception of an improved form-fitting wire frame which forms the subject matter of another co-pending U. S. application, Serial No. 474,588. In general, the pack D comprises a flexible container 50, consisting of a substantially rectangular shaped body portion 51 having side marginal flaps 52 secured therewith and top and bottom marginal flaps 53 and 54 respectively. These flaps 52, 53 and 54 are generally of the nature set forth in the U. S. Patent #1,403,983, and are provided with similar fastening and releasing means. Preferably, certain of the flaps are provided with transversely apertured cones such as shown at 55 in Figure 7 of the drawings, adapted to fit through suitable grommets or eyelets in other flaps. A preferred arrangement is that of providing the cones 55 on the top and bottom flaps; the side flaps being provided with grommets for slipping thereover. A flexible wire rip cord 56 is provided, having detent pins 57 for fitting through the openings on the studs or cones 55 to hold them in place and the flaps 52, 53 and 54 closed and wrapped about the compacted parachute canopy within the container 50. One of the conventional guard flaps 56 may guard the rip cord where it fastens upon the cones 55 as is shown in Figure 5 of the drawings.

Harness attached suspension webs or elements 58 extend into the pack at the top corners thereof. These webs 58, as set forth in U. S. Patent #1,554,192, have shroud lines connected therewith. The shroud lines are of course connected preferably to the parachute canopy shown at 60 in Figure 7 of the drawings. The shroud lines are bunched and compacted together and packed in a zig-zag relation in pockets 61 provided on the inside surface of the body wall 51 of the container, as shown in section in Figure 7 and described in detail in the above mentioned U. S. Patent #1,554,192. The parachute canopy 60 is of course folded zig-zag on the body wall of the container after the shroud lines have been folded. A pilot parachute 62 is preferably employed after the manner set forth in U. S. Patent #1,403,983, shown folded in the parachute pack in Figure 7 of the drawings. It is separated from the main parachute by means of auxiliary flaps 63 attached to the insides of the side flaps 52 of the container and overlapping each other in a releasable relation. This pack is held in form-fitting relation by means of the semi-rigid frame 70 shown in Figures 14, 15 and 16 of the drawings, which is coextensive with the shape of the pack and slipped into a pocket provided in the wall 51 between the two layers of material forming a part of that wall, as is well shown in Figure 7 of the drawings. This wire frame 70 comprises the upright side bars 71 of similar shape and the upper and lower-most transverse bars 72 and 73 respectively, which are suitably secured to the annular ends of the bars 71 as shown in the drawings. A series of curved transverse flexible bars 74 are provided intermediate the upper and lower-most bars 72 and 73, which may be provided in any approved number. To suitably reinforce and rigidly maintain the upper and lower portions of the frame 70 in proper form-fitting relation, diagonal bracing 75 may be resorted to, all of which is more specifically described and claimed in a co-pending U. S. application, Serial No. 474,588. The essential features of the frame 70 are the fact that the same is semi-rigid, yet will admit of a transverse and a vertical flexing, while yet maintaining the form-fitting relation upon the chair and the wearer when resting thereon or attached thereto.

It is quite apparent that all of the transverse bars 72 and 74 are concaved, with their concave sides facing in the same direction. The side bars 71 are shaped to fit the sides of the back and the shoulder blades of the wearer in a manner which has been described in co-pending U. S. applications above mentioned. This frame is of course sewed into the pocketed arrangement provided between the inner partition and outer wall 51 of the pack container, and it holds the outer wall 51 in a concaved body form-fitting shape. When the flaps of the parachute container are drawn about and closed over the compacted parachute the frame is laterally deflected and tensioned, being thus bent from the full line position shown in Figure 16 to the dotted line position. This feature enables the flaps of the container to be quickly thrown open upon removal of the rip cord by the operator, to permit an instant release of the parachute canopy. The upright flexure of the form-fitting frame 70, shown in the full and dotted lines in Figure 14, enables the wearer to bend his or her back forwardly or rearwardly within certain limits. It should be remembered that a pack with such frame is not a soft pack, but is held in a form-fitting relation by the pack and may only flex within certain limits. By reason of the frame the pack is held semi-rigid and may be very thin in cross section, tapering from the side edges where the pack is thinnest to the intermediate portion where the pack may be thicker. In cross section the pack thus presents a substantial crescent-shape. The pack as described and shown is of the back form-fitting type, but it may be of any other form-fitting type adapted to conform in a body fitting relation to any other part of the aviator or passenger upon which it is found best to place the same. The pack D fits snugly in the concavity of the back rest portion 33 of the chair B, with the convex or flap side of the pack container immediately facing the back of the chair. The forward body fitting cavity of the pack may or may not receive upholstery thereon. In the preferred instance back padding or upholstery is placed directly on the pack wall 51 to cover the same and render it more comfortable.

Prior to describing the improved features of the harness F, it is to be noted that the upholstery structure E, best shown in Figure 11, comprises a back pad 80 and a seat pad 81. These pads 80 and 81 are flexible and each comprise front and rear flexible walls and marginal bounding walls with preferably kapok padding therebetween. This buoyant material will enable the jumper to keep afloat in event of a descension in a body of water.

The back padding 80 tapers convergently upward. The rear of the seat pad 81 convexedly extends rearwardly and at its rear wall is permanently connected with the bottom of the back pad 80 by means of a strong flexible sheet-like hinge connection 83, the side margins of which terminate short of the side marginal portions or corners at the juncture of the seat and back pads, such as will enable the rear corners of the seat pad 81 to be tucked beneath the lower corners of the back pad 80 when in position on the chair.

It must be remembered that the lateral and longitudinal dimensions of the pack D are substantially fixed, due to the form-fitting frame which is co-extensive with the shape of the pack. For this reason it is desirable that the upholstery back and seat padding be such that it may be adapted to various sizes of form-fitting packs. It is readily understandable that for a small man it will be necessary to use a smaller form-fitting back pack than for a larger man. However, it is desirable to use the same upholstery or padding E independent of the size of the passenger or aviator. Inasmuch as it is desirable to fasten the upholstery back and seat pads with respect to the parachute pack and harness apparatus, adjustable snap fastening complementary parts have been provided on the pack and upholstery pads 80 and 81. Thus, as shown in Figure 6, the exterior surface of the form-fitting rear wall 51 of the pack D is provided with upper preferably male snap fastener parts 84; lower preferably male fastener parts 85, and side snap fastener male parts 86 along each of the margins of the wall 51. If desired, a male snap fastener part 87 may be centrally provided upon the wall 51, as shown in Figure 6. Complementary pairs of snap fastener female parts 88 are provided on the rear surface of the back pad 80, as shown in Figure 11, for selectively receiving the corner fastener parts 84 of the pack in order that the pad 80 may be adjusted to the particular size of the form-fitting pack used. In like manner pairs of female snap fastener parts 89 are provided on the rear surface at the lower end of the pad 80 for each of the snap fastener parts 85. Also pairs of female snap fastener parts 90 are provided on the rear surface along each of the sides of the back pad 80 for each of the snap fastener parts 86 of the pack. A center snap fastener part 91 may be provided on the pack pad 80 for the snap fastener 87 of the pack. Thus, a plurality of snap fastener parts may be provided on the rear of the back pad 80 for each of the complementary and respective snap fastener parts on the pack D. Of course, it is immaterial whether the male parts are on the pack or upholstery. The snap fastener parts are of the glove type and readily attached by pushing them together and detached by pulling them apart with sufficient force.

When properly applied, the back pad 80 of the upholstery structure E conforms with the form-fitting wall 51 of the pack, as shown in Figure 7.

In position the seat pad 81 of course covers the chair seat member 31.

Referring to the harness F, the same is generally of the character set forth in United States Patent #1,560,366, except as modified for attachment to the form-fitting pack and to serve the objects of the present invention. In the main, the harness F comprises the U-shaped body or sling portion 100, which is of the usual parachute harness webbing, and comprising a pair of lengths stitched together. This U-shaped sling 100 comprises the main body support for the parachutist, and the webbing straps 58 above mentioned extending into the pack D are a part thereof. Diagonal portions 102 are suitably connected at 103 to the U-shaped sling 100. It should be mentioned at this point that the U-shaped sling 100 extends beneath the seat pad 81 at a location preferably forwardly of the arm rest supporting posts 28. It is placed thus in order that the passenger or aviator may sit in the U-shaped sling 100 much in the same manner that a person would sit in an ordinary rope swing. When the harness is not strapped about the passenger or aviator he or she is entirely unconscious of the fact that the U-shaped webbing 100 extends beneath the seat 81. It is held in place beneath the seat pad 81, as shown in Figure 8, preferably by means of snap fasteners 104, complementary parts of which are shown at 104ª on the bottom of the seat pad 81, in Figure 11, and the other parts of course being attached to the harness sling webbing. Thus, there will be no liability of displacement of the seat portion of the sling 100 with respect to the seat pad 81. If desired, the snap fasteners 104 may be done away with. The diagonal straps 102 above mentioned have their connection 103 at a location on the side portions of the sling 100 just below the arm rests 27, and therefrom the portions 102 extend rearwardly and diagonally across the form-fitting wall 51 of the pack D, crossing at the location 106 shown in Figure 6, and being secured to the wall 51 of the pack as by stitching 107. From the crossing point 106 the diagonal straps 102 project upwardly from the top of the pack in a bowed relation, and extend to the opposite sides of the seat where they are connected adjustably, by clamps 108, to the main suspension webs of the sling 100 of the harness, as shown in Figure 1. Therefrom the webbing comprising the continuation of the diagonal harness straps 102 extends along the sides of the chair and adjustably through suitable loops 110 between the lengths of material in the sling 100, just above the connections 103 above mentioned, and the ends of the webbing slipped through the loop openings 110 are then brought into overlapping relation rearwardly across the outer face of the form-fitting wall of the pack D, as shown at 111 in Figure 6 of the drawings, and adjustably connected to each other, as by clamps 112 shown in Figure 1, to permit of the adjustment in width of the harness. These webbing portions 111 are relatively movable and retained on the pack D by means of one or more loops 113, shown in Figure 6. For the main part these are conventional features of the harness set forth in U. S. Patent #1,560,366 above mentioned.

It should be remembered that the harness should be supported so that the passenger or aviator may quickly attach the same when the emergency arises. To this end it is preferred that the webbing 102, where it extends upwardly from the back pack D and outwardly between the head rest and the top of the seat pad 80, should be held in an inverted U-shaped looped relation at each side of the sitter. To maintain the harness webbing in this position (as shown in Figure 1), it is preferred to provide steel or other rigid or semi-rigid stays 115, attached to the webbing 102 at this location, as shown in Figure 13 of the drawings. These stays 115 are preferably spring steel and attached to the webbing by means of suitable textile material stitched in place. The spring stays 115 are inverted in a J-shaped relation and at their lower ends are stitched at 116 along the sides to the outer surface of the wall 51 of the pack D, as shown in Figure 6. This holds the springy stays 115 in proper position, relatively diverging at their upper ends away from the top of the pack and bowing outwardly and forwardly at the sides of the operator for holding the suspension webs 58 and the harness webs 102 of the harness F in loop-like relation at the opposite sides of the sitter, so that, as can be seen from Figures 1 and 2 of the drawings, the passenger or aviator may readily slip his or her arms into the open loops should the occasion necessitate.

The passenger or aviator ordinarily sits in the improved parachute chair as shown in Figure 2, and it is readily understandable that the chair is very comfortable and capable of being adjusted to suit the comfort of the passenger or aviator. There is just sufficient of the parachute apparatus visible to inform the individual that the parachute is there if it is necessary to use it. Should there be an emergency necessitating the use of the parachute, it is merely necessary for the operator, from the position shown in Figure 2, to lift his or her arms and slip them through the already open loops of the harness F, quickly snap the complementary fastener parts 120 together across his or her chest, to the position shown in Figure 4. Depending leg straps 121 extend from the sling portion of the harness beneath the seat pad and are provided with fastener parts 122 for snapping onto the complementary fastener parts 123 adjacent the connections 103 on the harness above described, for encircling the harness about the legs of the wearer. Thus, the individual needs merely to snap the fastener parts together at three points. The individual may now arise with the pack held form-fitting on the back of the individual. The upholstery seat and back pads of course are strapped about the individual, and the upholstery together with the back pack are not connected positively in any manner to the chair proper, nor to the head piece C. This permits the individual to instantly arise without obstruction, and leave the aircraft in the manner prescribed. The parachute apparatus is of the free jump type and the passenger or aviator jumps or is catapulted from the aircraft. The rip cord 56 extends through a suitable flexible protecting housing 130, upwardly over the shoulder, and terminates in a handle 131 releasably retained in a suitable pocket 132 secured on the harness at the breast or side of the wearer. Before, or at the time of jump, the individual grasps the handle and after separation from the aircraft the handle is pulled out of its pocket and jerked. The rip cord detents are thus released from the cones on the pack, and the flaps are thrown quickly open by means of elastic bands 134 under tension, if it is thought best to provide the same. This action is assisted by the spring action of the pack frame 70 which has been under tension due to closure of the parachute pack container 51, and now swings from the dotted line position in Figure 16 to the full line position in Figure 16. This draws the flaps relatively away from each other, more quickly exposing the pilot and main parachutes. Of course the pilot parachute takes the air first and acts as an anchor. As the individual drops away from the anchored pilot parachute the main parachute is extended, becomes deployed, and the shroud lines are of course pulled out of their pockets on the inside of the body wall of the pack container, until they become taut. Inasmuch as the shroud lines are connected to the suspension webs 58 the latter are then extended and the individual is then suspended in a swing-like relation in the harness and descends slowly. During this descension the back and seat of the wearer are protected by reason of the upholstery pads, which are also of buoyant material and will keep the individual afloat if it should happen that he or she should alight upon a body of water.

It should be noted from Figure 12 of the drawings that the back pack rests at its lower end upon the frame of the seat 31, or it may rest at its lower corners on the rear corners of the seat pad 81, which may be suitably tucked beneath the pack for that purpose.

Thus, the load of the pack is not at any time supported by the individual in the chair, notwithstanding that the harness may be wrapped about the individual and secured in place.

It is within the contemplation of the invention to do away with the straps 121 which extend between the legs of the wearer, and relatively connect the snap fastener parts 123 or special fasteners at the same location across the lap of the wearer. This would provide in effect a two-point connector type of harness, particularly adaptable for women, with one connection at the chest and the other connection transversely below the lap.

It is to be particularly noted from Figure 3 of the drawings that the head rest is sufficiently thick that it cooperates with the countersunk or concavely formed back rest of the chair in permitting the form-fitting back pack, together with the back pad of the upholstery, to be received in a position where the head rest may project forwardly of the front surface of the back pad of the upholstery and enable the wearer to seat comfortably. It is to be noted from Figure 10 that the lower outline of the head rest is convexed, so that there will be no difficulty of the upper portion of the parachute pack catching on the head rest when emergency necessitates attachment of the pack to the body of the wearer and the arising of the wearer from the chair.

For precautionary reasons some passengers and aviators may prefer to have the harness strapped around them during flight prior to an emergency. This may be done, and comfort is still assured with the increased safety factor, by reason of the fact that not only is the parachute pack and upholstery padding associated therewith disposed in a form-fitting relation about the passenger or aviator, but it should be remembered that the pack is longitudinally flexible within defined limits, due to the construction of the form-fitting frame 70 shown in Figure 14.

It is within the contemplation of this invention to provide a seat type of parachute pack, and a chair provided with a suitable countersunk seat wherein the seat pack may be placed in an out of the way relation. This seat pack may be form-fitting if desired, and as in conventional practice it would be attached to the bottom sling portion of the harness F, beneath the seat pad 81.

Various changes in the shape, size, and arrangement of parts may be made to the form of invention herein shown and described, without departing from the spirit of the invention or the scope of the claims.

We claim:

1. In parachute apparatus a chair including a seat and a back rest, a form-fitting pack resting against the back rest provided with a forwardly facing contour shaped to receive the contour of a person's back in a form-fitting engagement, body encircling harness connected with the pack, an independent head rest pad connected upon the back rest in non-obstructing relation with the pack and its harness, said harness including shoulder engaging webbing extending in outstanding open arm receiving loops from its connection with the pack forwardly below the head rest.

2. In parachute apparatus a chair including a seat and a back rest, a parachute pack supported upon the chair, a harness attached to the pack including a U-shaped sling, means fixedly forming part of the harness to support the sling at the sides of the back rest in a laterally opened and supported position for instant attachment to a sitter in the chair, means supporting the sling across the seat of the chair in position for unobstructed attachment upon the sitter, and means for attachment of the sling to the upper and lower portions of the body of a person sitting in the chair.

3. In parachute apparatus a body attaching harness having shoulder straps, and shape holding elements fixedly attached to the shoulder straps for holding them in open looped inverted U-shaped position.

4. In parachute apparatus a body attaching harness having shoulder straps, shape holding elements fixedly attached to the shoulder straps for holding them permanently in open looped inverted U-shaped position, and a parachute pack connected with said harness.

5. In parachute apparatus a body attaching harness having shoulder straps, shape holding elements attached to the shoulder straps for holding them in open looped inverted U-shaped position, and a parachute pack connected to the harness with the latter attached to the pack along one end of each of the shape holding elements to hold the latter in extending relation from the pack.

6. In parachute apparatus a body attaching harness having shoulder straps, shape holding elements attached to the shoulder straps for holding them in open looped inverted U-shaped position, a parachute pack connected to the harness with the latter attached to the pack along one end of each of the shape holding elements to hold the latter in extending relation from the pack, and a flexible seat pad carried by the harness upon which the wearer sits during descension.

7. In parachute apparatus the combination of harness including portions extending along and across the front and back of a wearer and including shoulder straps, shape holding spring members conforming to and holding the shoulder straps in an inverted open U-shaped position, a back pack including a container connected to the harness at the portion which extends across the back of a wearer, a parachute for packing in said container, means connecting the parachute with the harness including flexible suspension lines extending to attachment with the front of the harness, said harness including a sling connected with said suspension lines for extension across the seat of a wearer.

8. Parachute apparatus comprising a stationary chair frame having relatively adjustable seat and back portions connected therewith, a parachute pack mounted on said back portion in unattached relation therewith, and harness connected with said pack and extending forwardly at the sides of the back pack in outstanding relation therefrom, and means for clamping said side portions of the harness upon the body of a wearer sitting in the chair, said harness being free of fixed attachment with the chair.

9. Parachute apparatus comprising a stationary chair frame having relatively adjustable seat and back portions connected therewith, a parachute pack mounted on said back portion in unattached relation therewith, harness connected with said pack and extending forwardly at the sides of the back pack in outstanding relation therefrom, means for clamping said side portions of the harness upon the body of a wearer sitting in the chair, said harness being free of fixed attachment with the chair, said harness including a sling portion extended across the chair seat and free of connection therewith, and an upholstery pad on top of said sling and resting on said chair seat.

10. In parachute apparatus a form-fitting parachute pack having a co-extensive form-fitting shaping frame connected therewith, harness attached to the pack, an upholstered pad connected on the form fitting surface of said pack, said upholstered pad and pack having snap fasteners to releasably attach the same together, the upholstered pad having a plurality of snap fastener parts for the complementary individual parts of the pack to accommodate various sizes of packs to an upholstered pad.

11. In parachute apparatus an aviator's chair, a parachute pack, means on the chair to releasably accommodate the parachute pack, a harness operatively connected with the pack including releasable side portions for fitting about the body of a wearer, means to hold said releasable side portions extended and in a position for instant application at the sides of a sitter, said harness including a sling portion beneath the seat of the sitter, an upholstered seat, and means detachably connecting the upholstered seat directly to the sling of the harness beneath the seat to hold the sling in proper relation to the seat.

12. In a parachute chair for aviators the combination of a chair having means to releasably receive a parachute pack, and a detachable head rest for the chair comprising a flexible pocket releasably fitting the top of the chair provided with depending flaps, between the chair and the pack.

13. In parachute apparatus a chair including a seat and a back provided with a countersunk forwardly facing compartment, a semi-rigid form-fitting parachute pack for said compartment including a container having a body portion and marginal attaching flaps connected therewith, a form-fitting resilient shape holding frame co-extensive with the body portion of the container and shaped to hold the pack with the body portion of the container in a form-fitting relation against the back of a wearer, a parachute in the pack, means to releasably connect the flaps together to compact the parachute in the pack, a harness, means operatively connecting the harness with the parachute, said chair being shaped to support the pack thereon independent of the user and with the form-fitting wall of the container facing forwardly from the back of the chair.

14. In parachute apparatus a chair including a seat and a back provided with a countersunk forwardly facing compartment, a semi-rigid form-fitting parachute pack for said compartment including a container having a body portion and marginal attaching flaps connected therewith, a form-fitting resilient shape holding frame co-extensive with the body portion of the container and shaped to hold the pack with the body portion of the container in a form-fitting relation against the back of a wearer, a parachute in the pack, means to releasably connect the flaps together to compact the parachute in the pack, a harness, means operatively connecting the harness with the parachute, said chair being shaped to support the pack thereon independent of the user and with the form-fitting wall of the container facing forwardly from the back of the chair, said harness including a U-shaped body attaching sling, means holding said sling outstanding at the side of a sitter and across the top of the seat of the chair in position that the aviator must sit directly therein when using the chair, and means for attaching the sling releasably about the body of the sitter.

LOUIS J. CAMPBELL.
LYMAN HANOVER FORD.
HAROLD GLENN ROGERS.